March 14, 1939.  J. D. BERWICK  2,150,412
FLANGED HOSE AND METHOD OF MAKING
Filed Sept. 14, 1937
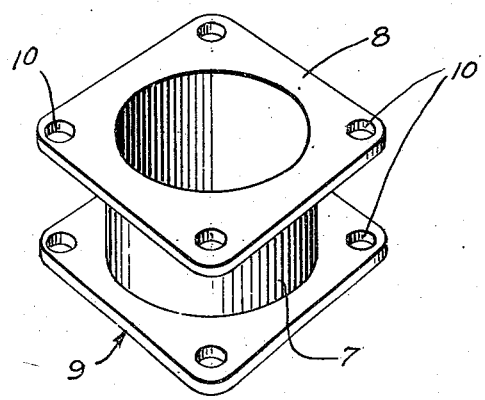
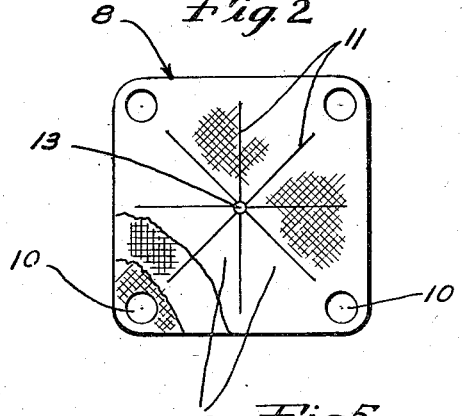
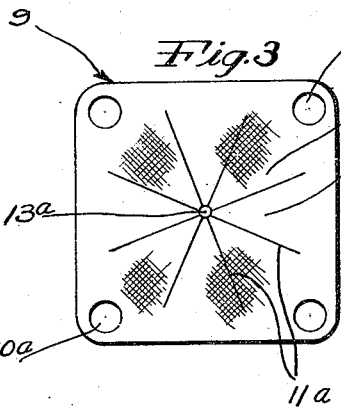
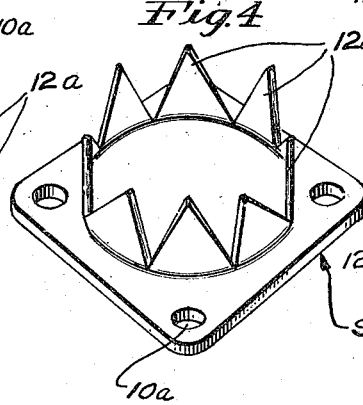
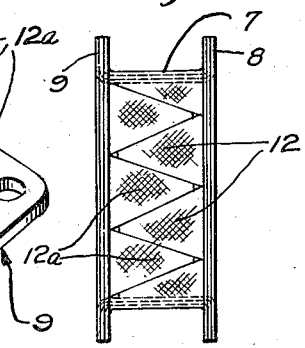
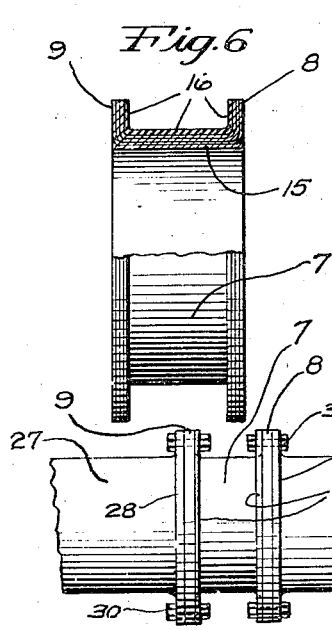
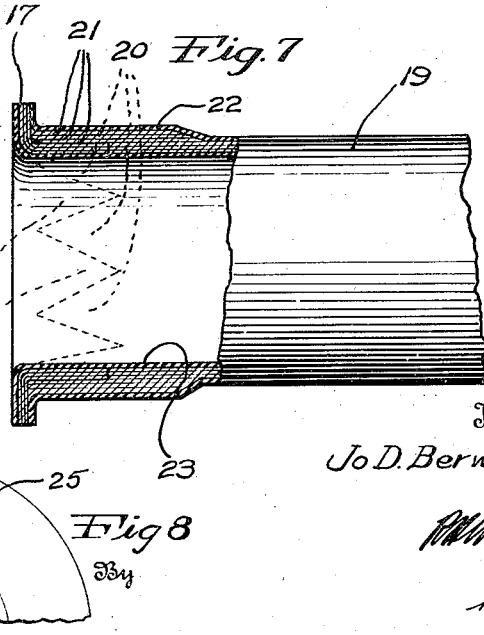
Inventor
Jo D. Berwick
By
his Attorney Patented Mar. 14, 1939

2,150,412

UNITED STATES PATENT OFFICE 2,150,412

FLANGED HOSE AND METHOD OF MAKING

Jo D. Berwick, Akron, Ohio, assignor to Wingfoot Corporation, Wilmington, Del., a corporation of Delaware Application September 14, 1937, Serial No. 163,816

2 Claims. (Cl. 285—90)

This invention relates to improvements in hose which is constructed of rubber and fabric, or the like, and it refers more particularly to hose provided with flanged ends, so that it may readily serve as a connection between various parts of the apparatus for the purpose of conveying fluid such as air, water or steam.

The previous method of forming hose flanges of this type has been to flare out the ends. This method requires considerable time and is quite laborious and due to the stretch and distortion necessarily accompanied therewith, failure occurs when the flanges are tightly clamped between metal rings.

Metal flanges have been secured to the ends of hose for coupling purposes, but this construction is expensive, and in cases where a short connection is required it would be impossible to install them due to a lack of space.

One object of this invention is to provide a flexible flanged hose coupling to connect metal tubing on pipes in automobile tractors, airplanes and the like, where, due to the construction of the hose, it will effectively resist vibration.

Another object is to provide such a flanged hose which will be capable of withstanding the heat of the motor and deteriorating effects of the fluid being conveyed. Another object of this invention is to provide a flanged hose coupling that can be made into very short lengths or can be made into greater lengths to fit any particular installation requirement.

A further object of the invention is to provide a flanged hose coupling that is inexpensive, made with a minimum of labor and which will be compact, and durable in service.

The foregoing and other objects and advantages will be manifest in the following description and the accompanying drawing wherein the invention has been shown merely by way of illustration and wherein:

Fig. 1 is a perspective view of a finished hose coupling embodying one form of the invention;

Fig. 2 shows one of the coupling flanges blanked out of a web of material;

Fig. 3 is a similar view showing the other coupling flange;

Fig. 4 is a perspective view showing the next step in shaping the flange of Fig. 3;

Fig. 5 is a side view of the flange elements showing angular tabs intermeshed to form the body of the hose;

Fig. 6 is a side view partly in section showing the finished product;

Fig. 7 is a modification showing how a greater length of hose is constructed; and Fig. 8 is an assembly showing how the hose coupling is applied in a typical installation.

Where space is limited and a short flanged hose is required, the form embodied in Figs. 1 and 6 can advantageously be employed, said form is comprised of a cylindrical body 7 having at its ends the flanges 8 and 9 which are provided with the bolt holes 10 for the purpose of attaching to flanges of other apparatus through the aid of clamping rings, as illustrated in Fig. 8, and will be described later. The hose is made by stamping from a web of rubberized, laminated cross-woven duck fabric, rectangular or other suitable shaped members 8 and 9 as illustrated in Figs. 2 and 3.

In Fig. 2 radial slits 11 are stamped or cut in the central portion thereof forming the angular tabs 12. The small hole 13 in the center is for the purpose of permitting the punch to make a clean cut at the center where the points of the tabs converge, and facilitate separation of the tabs at this point. The bolt holes 10 are also stamped around the outer surface, said outer surface forming the flange 8 of the hose, and the angular tabs forming the cylindrical body portion 7 when assembled with its mating stamping 9.

The stamping 9 illustrated in Fig. 3 is similar to the stamping 8 except that the radial cuts 11$^a$ are at different angles with respect to the radial cuts 11 and to the bolt holes 10. This is for the purpose of bringing the bolt holes 10 into alignment with bolt holes 10$^a$ when the mating stampings are assembled. The stamping 9 is also provided with a central hole 13$^a$ for the purpose described in the foregoing.

When the members illustrated in Figs. 2 and 3 are properly stamped or cut out, the angular tabs 12 and 12$^a$ are pushed out so that their position is at right angles to their original plane, and they take the form illustrated in Fig. 4. The members 8 and 9 are then assembled so that the tabs 12 and 12$^a$ are in intermeshed relation as illustrated in Fig. 5, after which, one or more strips of fabric 15 are applied to the inner circumferential surface, and a layer of rubber 16 is applied over the outer circumferential surface, and on the inner surfaces of the flanges as shown in Fig. 6, after which the hose is placed in a mold and vulcanized, the cylindrical portion 7 of the hose being formed by the intermeshing tabs 12 and 12$^a$, the reenforcing layers of fabric 15 and the rubber layer 16. The flanges are formed by the outer edge portions of the stampings. Thus it will be apparent that a substantial flanged hose can be constructed in the novel manner described in the foregoing. Greater lengths of flanged hose may advantageously be constructed by the method illustrated in Fig. 7. The flange 17 is formed in exactly the same manner as members 8 and 9 as described in the foregoing, and is provided with angular tabs 18. The hose 19 is of the conventional type and is composed of a plurality of plies of rubberized fabric and a layer of rubber covering the inner and outer surfaces. Angular tabs 20 are formed in the circumferential ends corresponding to the angular tabs 18 formed on the flange member 17 so that the tabs 18 and 20 will fit in intermeshed relation with one another, several plies of rubberized fabric 21 are then wrapped around the outer circumference, and over the intermeshing area of the tabs which reenforces the union between them. A layer of rubber 22 is then placed over these plies, and a layer 23 lines a corresponding area on the inside, both layers of rubber being extended to cover the sides of the flange 17. The structure is then vulcanized, providing a durable flanged end for a hose that may be connected to various devices, and for various uses.

In Fig. 8 a typical installation of the flanged hose is illustrated and comprises a tube or pipe 25 provided with a flange 26, and a tube 27 provided with a flange 28. Between the tube flanges 26 and 28 a flanged hose is positioned so that the flanges 8 and 9 of the hose coincide with the flanges 26 and 28, of the tubes and are clamped thereto through the aid of the clamping rings 29 and the bolts 30.

Although I have shown and described a square flange only, it is to be understood that the flange may take various shapes, such as circular, elliptical or otherwise, that will meet the requirements of a particular installation.

The invention provides a novel and economical method for the construction of flanged hose and it will be understood that modifications may be resorted to in the construction thereof, without departing from the spirit of the invention or the scope of the appended claims.

I claim:

1. A flexible flanged hose comprising a pair of opposing members formed of laminated rubberized fabric, said members each having flange portions and substantially cylindrically arranged pointed projections at one side, said projections of the two opposing members being interfitted to provide a short cylindrical hose body with the flange portions at each end thereof, and vulcanized rubber lining the interior and covering the exterior of said short hose body whereby permanently to join the opposing members together.

2. A flexible flanged hose comprising a cylindrical body of rubberized fabric formed with serrations at its end, an end flange member also of rubberized fabric having a substantially central opening and having a series of pointed projections surrounding said opening and adapted to fit snugly into the serrations on the end of the cylindrical hose body, and vulcanized rubber covering the pointed projections and the serrations to join them permanently together.

JO D. BERWICK.